United States Patent [19]

Friede et al.

[11] Patent Number: 5,751,750
[45] Date of Patent: May 12, 1998

[54] LASER SYSTEM AND METHOD WITH THERMALLY COMPENSATED OPTICS

[75] Inventors: Dirk Friede, Buchholz; Hermann Hage; Karl-Heinz Herzner, both of Hamburg; Volker Scholz, Luebeck, all of Germany

[73] Assignee: Rofin-Sinar Laser GmbH, Hamburg, Germany

[21] Appl. No.: 798,513

[22] Filed: Feb. 10, 1997

Related U.S. Application Data

[63] Continuation of PCT/EP95/03134, Aug. 7, 1995.

[30] Foreign Application Priority Data

Aug. 9, 1994 [DE] Germany .................. 44 28 194.3

[51] Int. Cl.$^6$ .................. H01S 3/04; G02B 5/08
[52] U.S. Cl. .................. 372/34; 372/29; 372/92; 372/98; 372/99; 372/107; 372/108; 359/838; 359/846
[58] Field of Search .................. 372/29, 33, 34, 372/35, 36, 92, 98, 99, 107, 108; 359/838, 845, 846

[56] References Cited

U.S. PATENT DOCUMENTS

| | | | |
|---|---|---|---|
| 3,708,223 | 1/1973 | Sorensen et al. | 372/34 X |
| 3,884,558 | 5/1975 | Dunn, III et al. | 372/34 X |
| 4,253,739 | 3/1981 | Carlson | 372/34 X |
| 4,287,421 | 9/1981 | DeBaryshe et al. | 372/34 X |
| 4,719,639 | 1/1988 | Tulip | 372/66 |
| 4,740,988 | 4/1988 | Knollenberg et al. | 372/99 |
| 4,998,824 | 3/1991 | Bluege | 372/34 X |
| 5,020,895 | 6/1991 | Giessen et al. | 372/107 |
| 5,181,215 | 1/1993 | Sam et al. | 372/34 |

FOREIGN PATENT DOCUMENTS

| | | | |
|---|---|---|---|
| 39 00 467 A1 | 7/1990 | Germany | 372/34 X |
| 42 12 779 A1 | 10/1993 | Germany | 372/34 X |
| 42 36 355 A1 | 5/1994 | Germany | 372/34 X |

OTHER PUBLICATIONS

Japanese Patent Abstract No. 2 105 483 (Katayama), dated Apr. 18, 1990.

*Primary Examiner*—Brian Healy
*Attorney, Agent, or Firm*—Herbert L. Lerner; Laurence A. Greenberg

[57] ABSTRACT

A laser system with compensated optics contains at least one optical element which is thermally coupled to a heat source in order to thermally compensate for a deformation of optical elements disposed in a beam path of the laser system. The deformation is brought about by the laser beam.

15 Claims, 4 Drawing Sheets

LASER SYSTEM AND METHOD WITH THERMALLY COMPENSATED OPTICS

CROSS-REFERENCE TO RELATED APPLICATION

This application is continuation of International Application Serial No. PCT/EP95/03134, filed Aug. 7, 1995.

BACKGROUND OF THE INVENTION

FIELD OF THE INVENTION

The invention relates to a laser system with compensated optics.

Optical elements, in particular mirrors which are located within a laser system, are highly thermally loaded in the case of high-power lasers because of the high power density in the laser beam. Therefore, cooling of the mirror is necessary as a rule. Temperature gradients which lead to an undesired thermal distortion of the mirror are thus produced in the mirror. That applies in particular to the resonator mirrors of high-power lasers since on one hand the loading of those mirrors because of the resonator transmissivity, which is typically between 10 and 50% at a given laser power, is significantly higher than in the case of mirrors disposed outside the resonator. On the other hand, the permissible deformation of the resonator mirrors is orders of magnitude smaller than in the case of mirrors which are located in the beam path outside the resonator.

Laser systems with so-called adaptive optics for the compensation of the thermal deformation of the optical components are known, for example, from German Published, Non-Prosecuted Patent Applications DE 39 00 467 A1, DE 42 12 779 A1 and DE 42 36 355 A1. In the case of a laser mirror head disclosed in German Published, Non-Prosecuted Patent Application DE 39 00 467 A1, which corresponds to U.S. Pat. No. 5,020,895, there is provided on the rear side of a mirror a cavity to which pressure can be applied, with the result that the geometry of the mirror changes. In the case of the solution known from German Published, Non-Prosecuted Patent Application DE 42 36 355 A1, a diaphragm mirror is displaced using a piezoelectric element as an actuator. In German Published, Non-Prosecuted Patent Application DE 42 12 779 A1, liquid crystal cells having optical imaging properties that can be controlled electrically are disposed in the resonator of a solid state laser. However, those known devices are technically complicated and expensive.

In the case of planar, diffusion cooled $CO_2$ slab lasers as are known, for example, from U.S. Pat. No. 4,719,639, the high expansion of the resonator mirrors, which extend over the entire width of the electrodes, has an additional unfavorable effect on their thermally caused distortion. The resonator geometry is disturbed and changes occur in the beam profile and the beam position. Therefore, in the case of known slab lasers exclusive use is made of mirrors in which the importation of heat is minimized by coatings that are as highly reflective as possible. However, the production of such layers is generally costly. In addition, as a result of unavoidable contamination, they lose their favorable reflection properties during operation.

SUMMARY OF THE INVENTION

It is accordingly an object of the invention to provide a laser system with compensated optics, which overcomes the hereinafore-mentioned disadvantages of the heretofore-known devices of this general type.

With the foregoing and other objects in view there is provided, in accordance with the invention, a laser system with compensated optics, comprising at least one optical element disposed in a laser beam path; and a heat source thermally coupled to the at least one optical element to compensate for a laser beam-created deformation of the at least one optical element.

It is possible to compensate for the deformation, brought about by the laser radiation, of the optical components, in particular the distortion of the resonator mirrors, through the use of the thermal coupling of a heat source, with as low an inertia as possible, to at least one of the optical elements which is disposed in the beam path of the laser system.

In contrast to the adaptive optics which are known from the prior art, in which such a compensation of the deformation or distortion is undertaken by a piezoelectric adjustment or by a regulatable liquid pressure or gas pressure or by liquid crystal cells, the thermally compensated mirror according to the invention can be constructed more simply and more cost-effectively. Furthermore, its use in the RF range is unproblematic.

In accordance with another feature of the invention, in order to compensate for the deformation, one or more of the optical elements which are disposed in the resonator-internal or resonator-external beam path of high-power lasers, can be thermally coupled to a heat source. Preferably, these are mirrors which are disposed in the beam path of the laser, in particular the metallic resonator mirrors of coaxial or planar slab lasers.

In addition, it has been shown that in many applications the thermal compensation of one single resonator mirror is sufficient in order to compensate for the thermal deformation, induced by the laser beam, of all of the optical elements disposed in the beam path.

In accordance with a further feature of the invention, the heat source is disposed on the rear side of a mirror disposed in the beam path of the laser system and is matched in its geometric form to the area of the mirror irradiated by the laser beam.

In accordance with an added feature of the invention, for the purpose of thermal compensation, there is provided a device for deflecting a given proportion of the generated laser light onto an absorbing layer disposed on the rear side of the mirror. This absorbing layer then acts as a heat source.

In accordance with an additional feature of the invention, there is provided at least one resistive heating element on the rear side or on the front side of the mirror as a heat source for the purpose of thermal compensation.

In accordance with yet another feature of the invention, there is provided a device with which part of the high frequency power that is used to excite the high-power laser is coupled out and used for the electrical supply of the heating element.

In accordance with a concomitant feature of the invention, the heating element is connected to a voltage source which can be controlled as a function of the laser power.

The invention finds its preferred application in the case of totally reflecting metallic resonator mirrors of high-power lasers, in particular slab lasers, as well as in the deflecting mirrors of the external beam path of high-power lasers.

Other features which are considered as characteristic for the invention are set forth in the appended claims.

Although the invention is illustrated and described herein as embodied in a laser system with compensated optics, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
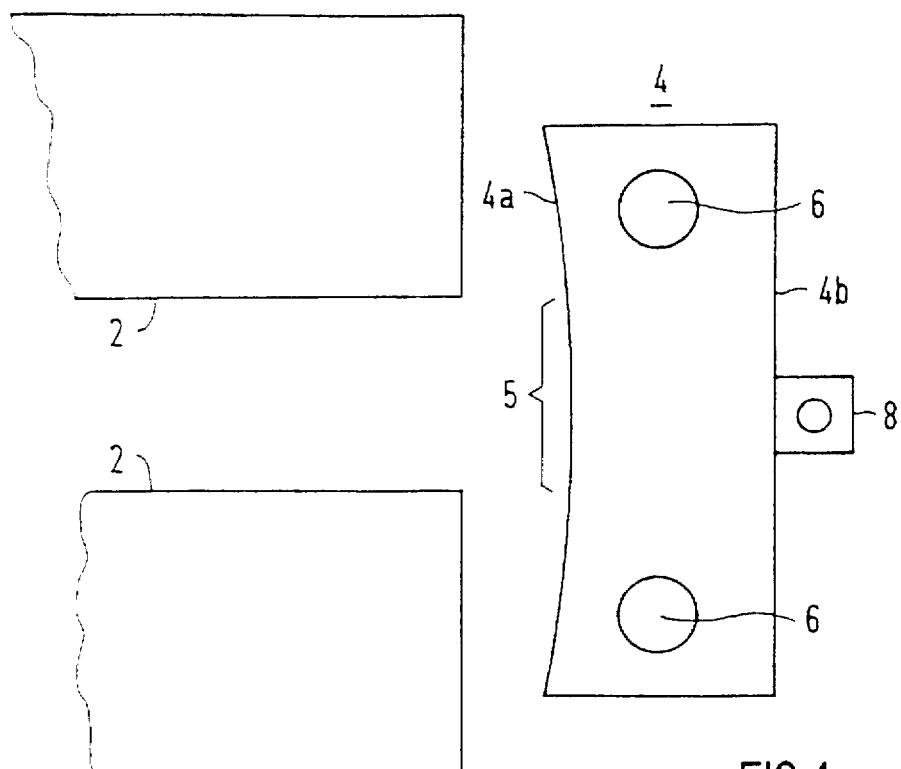
FIGS. 1 and 2 are respective fragmentary, diagrammatic, side-elevational and top-plan views of part of a resonator of a high-power slab laser according to the invention.

Referring now to the figures of the drawings in detail and first, particularly, to FIG. 1 thereof, there is seen a high-power slab laser that contains two plate-like electrodes 2 which are spaced apart from each other. At each end of the electrodes 2 a resonator mirror 4 is disposed that has a concavely curved mirror surface 4a in a plane at right angles to flat sides of the electrodes 2. The electrodes 2 form a hollow slab laser with a rectangular end surface, from which laser light emerges.

The emergent laser light is incident on the mirror surface 4a in a zone 5 and has the effect of importing heat locally there. Disposed in the resonator mirror 4 are channels 6 through which cooling water is conducted. The resonator mirror 4 is thermally coupled to a heat source. For this purpose, a resistive heating element 8 is disposed as a heat source directly on a rear side 4b of the resonator mirror 4 in the exemplary embodiment of FIG. 1.

Preferably, a jacket heating conductor is provided, with which a particularly good thermal contact with the resonator mirror 4 can be produced. The jacket heating conductor can, for example, be soldered onto the rear side 4b of the resonator mirror 4 or can be inserted into a groove which is located there and can be caulked into that groove. In this way, a transfer of heat is increased and thermal inertia of the compensation is reduced.

Figure 2:
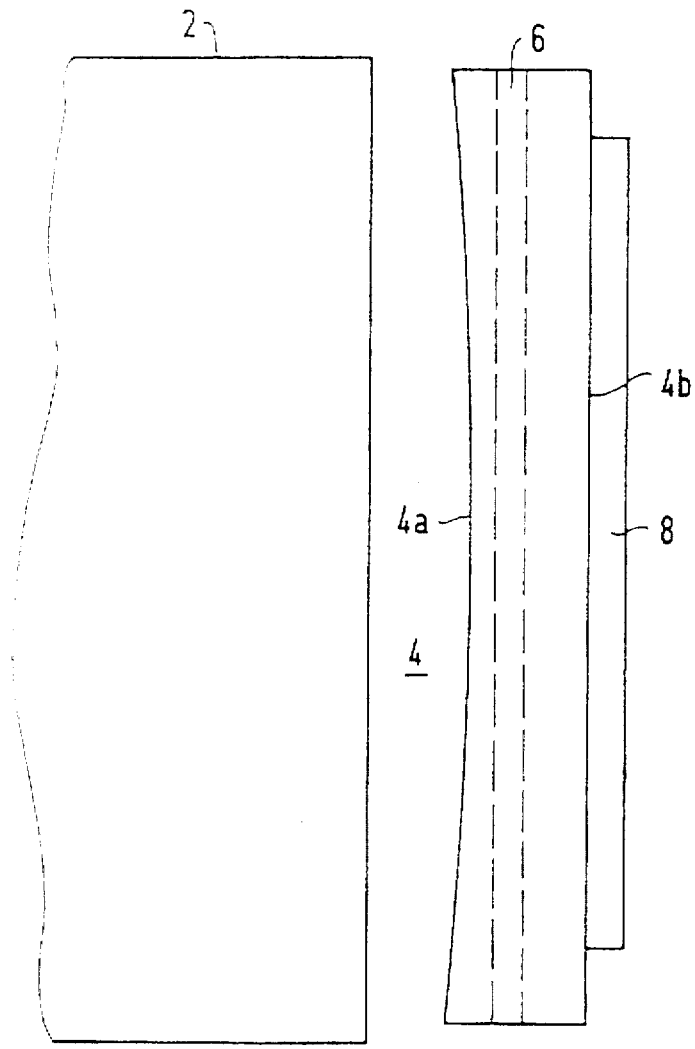

The importation of heat on the rear side 4b of the resonator mirror 4 is preferably carried out in a region 20 which corresponds in its geometric form to a beam profile that is incident on the resonator mirror and is disposed opposite the zone 5. As can be seen in FIG. 2, in the case of a planar slab laser this is a linear heating element 8 extending parallel to the end of the electrodes 2. The heating element 8 is able to be realized as a single jacket heating conductor. In the case of a coaxial slab laser, provision is made in an analogous manner for an annular heating element 8, for example a jacket heating conductor, which is shaped to form a ring. The electrical power which must be supplied for the compensation of the thermal deformation of the mirror 4 with the heating element 8 is approximately on the order of magnitude of the power absorbed by the resonator mirror 4 on the mirror surface 4a. In the case of a 2 kW laser, this is about 50–100 W.

Figure 3:
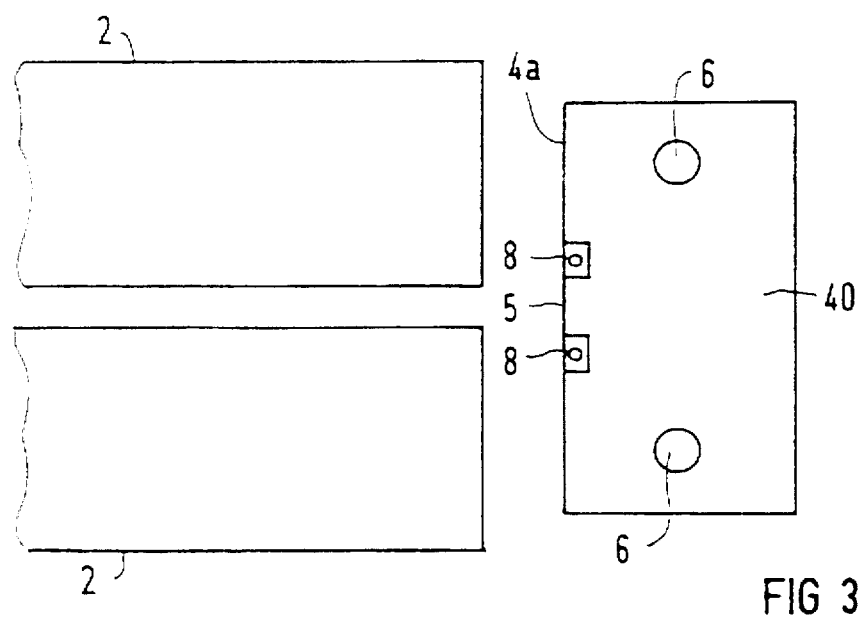
FIG. 3 is a fragmentary, side-elevational view illustrating a further advantageous embodiment of the invention.

In the embodiment according to FIG. 3, a resonator mirror 40 has a front side 4a facing the electrodes 2. The front side 4a contains two heating elements 8 which are disposed above and below a zone 5 which is loaded by the laser light. The heating elements 8 are, for example, two jacket heating conductors which are mortised into grooves and which extend parallel to a longitudinal edge of an exit surface for the laser light located between the electrodes 2. In this embodiment, the power supplied to the heating elements 8 is controlled in such a way that the sum of the power fed to the resonator mirror 40 by the laser light and the heating elements 8 is kept constant. The resonator mirror 40 is therefore thermally biased, even with the laser switched off. Through the use of a corresponding reduction in the electrically supplied power, the heat power additionally imported through the use of the laser light can be compensated for, so that the stresses in the resonator mirror 40 remain constant.

Figure 4:
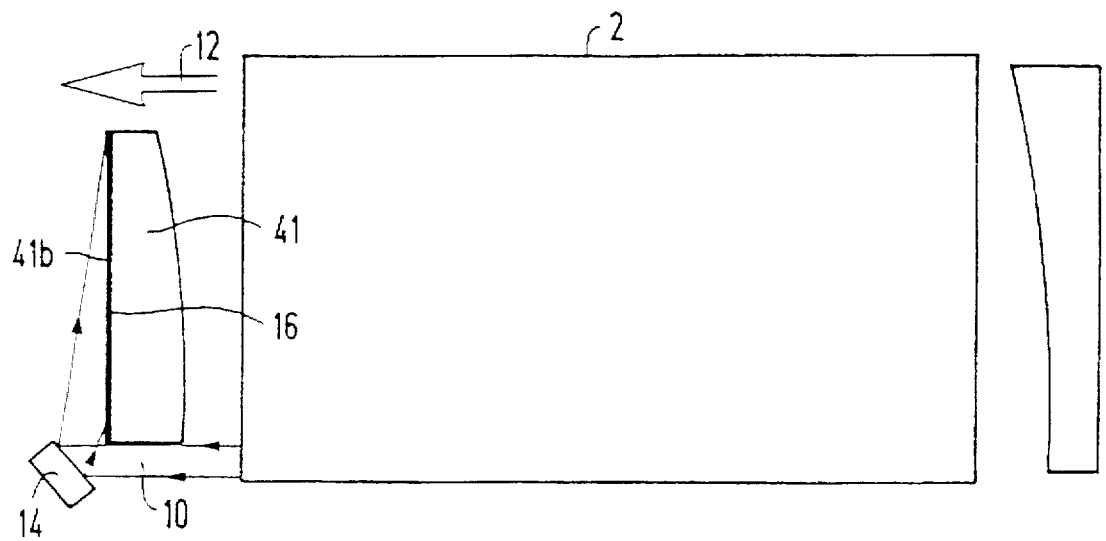
FIGS. 4 and 5 are top-plan views each showing a resonator of a slab laser with a thermally compensated resonator mirror.

In the exemplary embodiment according to FIG. 4, a part 10 of the radiation generated in the resonator is coupled out and used for heating a rear side 41b of a convexly curved resonator mirror 41. The illustrated resonator is a non-steady-state resonator of the positive branch, in which a laser beam 12 emerges from the resonator at an edge of the resonator mirror 41. The resonator mirror 41 likewise does not extend as far as the edge of the plate-like electrodes 2 at a side lying opposite an exit window for the laser beam 12, so that the part 10 of the laser light generated within the resonator likewise emerges there. The emergent part 10 is guided by a deflecting mirror 14 onto an absorbing layer 16 disposed on the rear side 41b of the resonator mirror 41.

Figure 5:
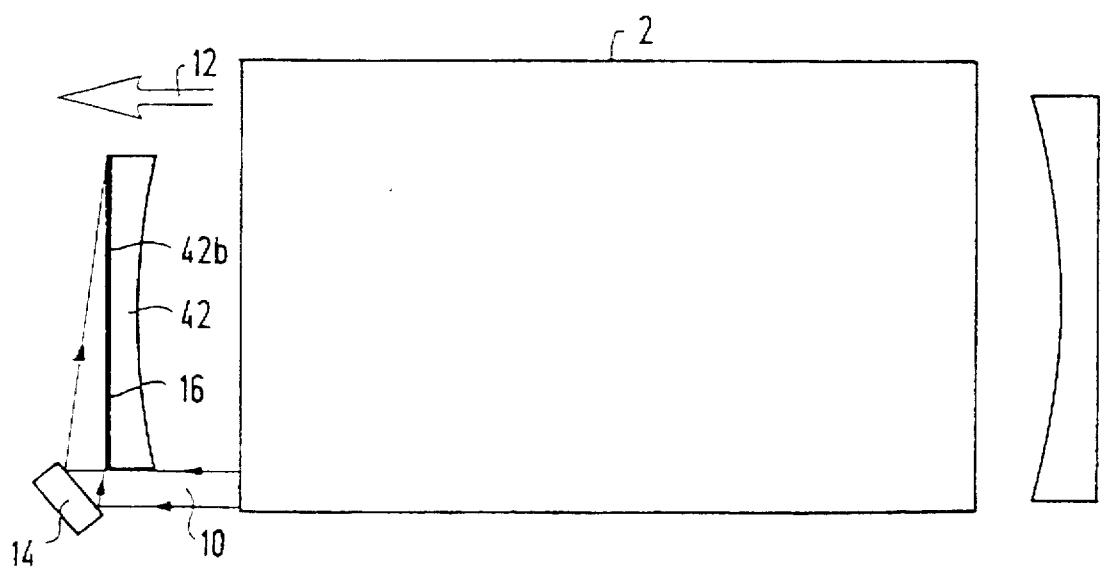

The exemplary embodiment according to FIG. 5 shows a non-steady-state resonator of the negative branch, in which a part 10 of the radiation generated in the resonator is likewise used for heating a rear side 42b of a concavely curved resonator mirror 42.

The absorbing layer 16 in the exemplary embodiments according to FIGS. 4 and 5 serves as a heat source for the compensation of the thermal deformation of the optical components located in the beam path of the laser light.

Figure 6:
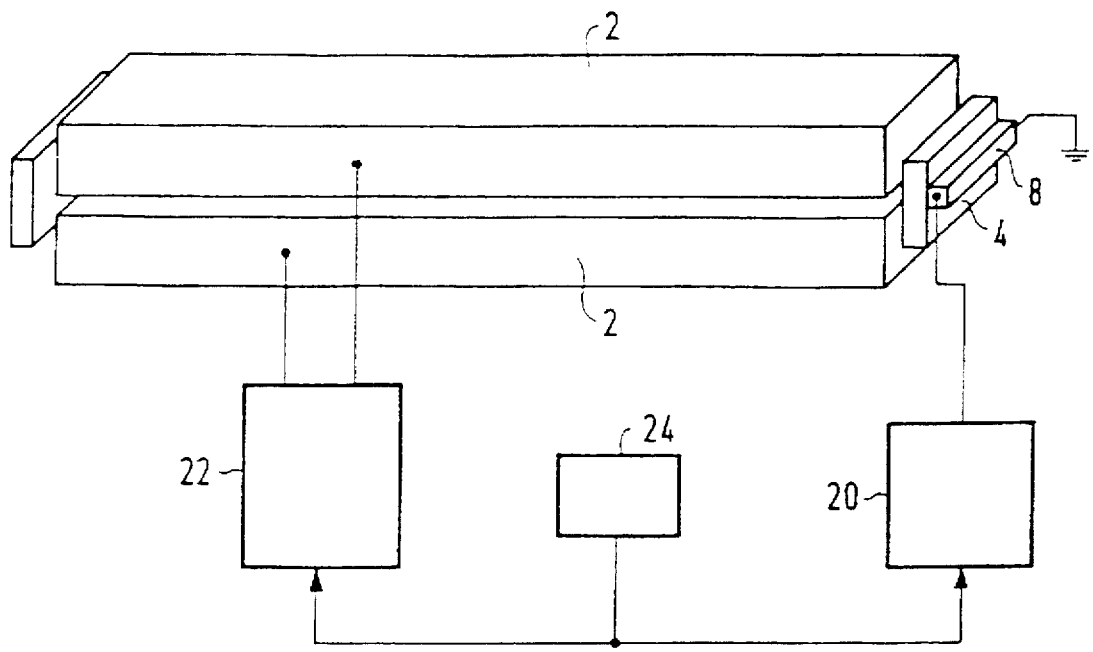
FIGS. 6 and 7 are perspective views each showing a further advantageous refinement of slab lasers with thermally compensated resonator mirrors.

According to FIG. 6, in a further embodiment of the invention, the heating of a resistive heating element 8 which is fitted on a rear side of a resonator mirror 4 is carried out through the use of an external DC or AC voltage source 20, in particular a transductor or magnetic amplifier. In order to supply the electrodes 2, a high frequency generator 22 is provided, having a power output which is controlled by a control device 24. This control device 24 also controls the voltage source 20 and the heating power of the heating element 8 in accordance with the power output, for example through a DC signal which is correlated with the laser power and is preferably filtered.

The AC voltage source 20 can also be a mains AC voltage which is already available, which is gated by a phase-gating controller that is known per se, as a function of the laser power and which is fed to the heating element 8 through a transformer.

In a further preferred embodiment of the voltage supply of the heating element 8, provision is made for a DC voltage which is generated through the use of rectification of the mains AC voltage and which is modulated with the grating or grid clock signal of a valve producing the high frequency. This modulated DC voltage is then automatically proportional to the laser power and, if appropriate, can be applied to the heating element through a transformer. In particular, before the modulation, a stabilization of the voltage generated by mains rectification is provided, in order to make the heating power fed to the heating element 8 independent of random mains fluctuations.

Figure 7:
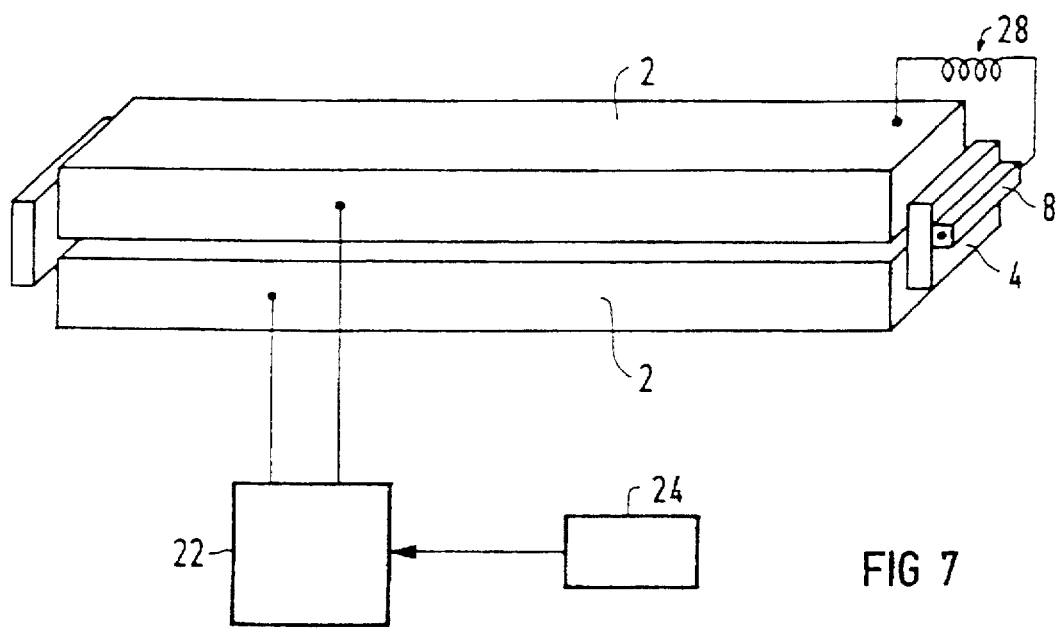

In the exemplary embodiment according to FIG. 7, the high frequency power fed to the electrodes 2 from the high frequency generator 22 is used for supplying the heating element 8. For this purpose, the heating element is connected between the electrodes 2 through a high frequency voltage divider 28. In this way, part of the HF power used for the excitation of the laser is coupled out and used for heating the resonator mirror 4. The heating power is thereby automatically proportional to the laser power and therefore proportional to the power reflected at the mirror.

We claim:

1. A laser system with compensated optics, comprising:
   at least one optical element disposed in a laser beam path; and
   a heat source thermally coupled to said at least one optical element to compensate for a laser beam-created deformation of said at least one optical element.

2. The laser system according to claim 1, wherein said at least one optical element includes at least one mirror to which said heat source is thermally coupled.

3. The laser system according to claim 2, wherein said at least one mirror is a resonator mirror to which said heat source is thermally coupled.

4. The laser system according to claim 1, wherein said heat source is at least one resistive heating element for thermal compensation.

5. The laser system according to claim 4, wherein said at least one optical element includes a mirror having a rear side disposed in the beam path, and said heating element is disposed on said rear side of said mirror.

6. The laser system according to claim 4, wherein said at least one optical element includes a mirror having a front side disposed in the beam path, and said heating element is disposed on said front side of said mirror.

7. The laser system according to claim 4, including a device for coupling out and using part of a high frequency power used for a high-power laser excitation, for an electrical supply of said heating element.

8. The laser system according to claim 5, including a device for coupling out and using part of a high frequency power used for a high-power laser excitation, for an electrical supply of said heating element.

9. The laser system according to claim 6, including a device for coupling out and using part of a high frequency power used for a high-power laser excitation, for an electrical supply of said heating element.

10. The laser system according to claim 4, including a voltage source to be controlled as a function of laser power, said voltage source connected to said heating element.

11. The laser system according to claim 5, including a voltage source to be controlled as a function of laser power, said voltage source connected to said heating element.

12. The laser system according to claim 6, including a voltage source to be controlled as a function of laser power, said voltage source connected to said heating element.

13. The laser system according to claim 2, wherein said at least one mirror is disposed in the beam path and has a rear side and an absorbing layer disposed on said rear side, and including a device for deflecting a given proportion of generated laser light onto said absorbing layer.

14. The laser system according to claim 3, wherein said resonator mirror is disposed in the beam path and has a rear side and an absorbing layer disposed on said rear side, and including a device for deflecting a given proportion of generated laser light onto said absorbing layer.

15. A method for reducing the deformation of at least one optical element in a path of a laser beam of a laser system, which comprises:
   providing an optical element in a path of a laser beam and a heating source; and continuously heating the at least one optical element at a substantially constant temperature profile to maintain the at least one optical element in a known deformed shape, the heating source and the laser beam continuously supplying the heat to the at least one optical element, reducing the heat from the heating source when the laser-beam is firing, increasing the heat from the heating source when the heating source is the only heat source.

* * * * *